US012035102B2

(12) United States Patent
Niu et al.

(10) Patent No.: US 12,035,102 B2
(45) Date of Patent: Jul. 9, 2024

(54) SOUND ABSORBING MATERIAL ENCAPSULATION STRUCTURE FOR SOUND PRODUCTION DEVICE, AND SOUND PRODUCTION DEVICE

(71) Applicant: GOERTEK INC., Shandong (CN)

(72) Inventors: Jiapeng Niu, Shandong (CN); Zhijun Sun, Shandong (CN)

(73) Assignee: GOERTEK INC., Weifang (CN)

( * ) Notice: Subject to any disclaimer, the term of this patent is extended or adjusted under 35 U.S.C. 154(b) by 237 days.

(21) Appl. No.: 17/786,586

(22) PCT Filed: Nov. 11, 2020

(86) PCT No.: PCT/CN2020/126923
§ 371 (c)(1),
(2) Date: Jun. 17, 2022

(87) PCT Pub. No.: WO2021/120915
PCT Pub. Date: Jun. 24, 2021

(65) Prior Publication Data

US 2023/0018827 A1 Jan. 19, 2023

(30) Foreign Application Priority Data

Dec. 19, 2019 (CN) ........................ 201911319291.X

(51) Int. Cl.
*H04R 1/02* (2006.01)
*H04R 1/28* (2006.01)
(Continued)

(52) U.S. Cl.
CPC ............ *H04R 1/288* (2013.01); *H04R 1/025* (2013.01); *H04R 9/025* (2013.01); *H04R 9/06* (2013.01)

(58) Field of Classification Search
CPC ...... G10K 11/162; H04R 1/288; H04R 1/025; H04R 9/025; H04R 9/06; H04R 2201/029; H04R 2400/11; H04R 1/2807
See application file for complete search history.

(56) References Cited

U.S. PATENT DOCUMENTS 10,349,168 B2 * 7/2019 Liu ...................... H04R 1/2811
11,272,290 B2 * 3/2022 Zhang ...................... H04R 9/02
2018/0124502 A1 5/2018 Liu et al.

FOREIGN PATENT DOCUMENTS

CN 204392531 U 6/2015
CN 204681564 U 9/2015
(Continued)

OTHER PUBLICATIONS

International Search Report from International Application No. PCT/CN2020/126923 mailed on Feb. 10, 2021.

*Primary Examiner* — Brian Ensey
(74) *Attorney, Agent, or Firm* — Shih IP Law Group, PLLC

(57) ABSTRACT

Provided are a sound absorbing material encapsulation structure for a sound production device, and a sound production device. The sound absorbing material encapsulation structure comprises: a rigid cavity wall enclosed to form a cavity of the sound absorbing material encapsulation structure, the cavity is configured to accommodate a sound absorbing material, the rigid cavity wall is provided with air permeability holes arranged in an array, the air permeability holes are configured to form a channel for air to flow in and out of the sound absorbing material encapsulation structure, diameters of air permeability holes are smaller than a diameter of sound absorbing material; a bottom plate sealed and connected to one end surface of rigid cavity wall, the bottom plate is configured to support the sound absorbing material; a covering plate provided to cover another end
(Continued)

surface of rigid cavity wall and sealed and connected to the rigid cavity wall.

10 Claims, 2 Drawing Sheets

(51) Int. Cl.
*H04R 9/02* (2006.01)
*H04R 9/06* (2006.01)

(56) References Cited

FOREIGN PATENT DOCUMENTS

| | | | |
|---|---|---|---|
| CN | 204887450 | U | 12/2015 |
| CN | 105828262 | A | 8/2016 |
| CN | 105872915 | A | 8/2016 |
| CN | 205987346 | U | 2/2017 |
| CN | 107659876 | A | 2/2018 |
| CN | 108377451 | A | 8/2018 |
| CN | 108668207 | A | 10/2018 |
| CN | 109218939 | A | 1/2019 |
| CN | 111083602 | A | 4/2020 |

* cited by examiner

SOUND ABSORBING MATERIAL ENCAPSULATION STRUCTURE FOR SOUND PRODUCTION DEVICE, AND SOUND PRODUCTION DEVICE

TECHNICAL FIELD

The present disclosure relates to the technical field of acoustics, and more particularly, relates to a sound absorbing material encapsulation structure for a sound production device and a sound production device.

BACKGROUND ART

In the design of miniature loudspeakers, in order to reserve enough space for the entire machine, the volume of the speaker module is generally compressed. Under the premise that the acoustic driver remains unchanged, different CAP housing designs have become a mainstream research trend. Although the CAP housing has various sizes, and a rear cavity of the module of the corresponding CAP housing also has various volumes, but different CAP modules are required to achieve the same frequency response and intrinsic frequency as much as possible. Therefore, it is necessary to provide a sound absorbing Harp powder pack on the CAP housing module with a smaller rear cavity volume. The Harp powder pack may increase the virtual acoustic volume of the rear cavity, so that the acoustic module with a smaller rear cavity can have the same acoustic performance as other modules.

In the prior art, the Harp powder pack forms a cavity by using a flexible injection-molded mesh cloth through ultrasonic welding, then the sound absorbing powder is filled in the cavity, and then the cavity is sealed. Since the injection-molded mesh cloth is a flexible material, it is easily squeezed by other components of the sound production device after the Harp powder pack is disposed. A sound absorbing material is generally a porous brittle material, and is easily crushed to lose functions thereof. The crushed powder is easy to contaminate the sound production device.

Therefore, it is necessary to improve the existing Harp powder pack to solve the problem that the sound absorbing material is easily crushed.

SUMMARY

An object of the present disclosure is to provide a sound absorbing material encapsulation structure for a sound production device, so as to solve the problem that the sound absorbing material is easily crushed in the existing Harp sound absorbing material encapsulation structure.

Another object of the present disclosure is to provide a sound production device including the above-described sound absorbing material encapsulation structure.

A sound absorbing material encapsulation structure for a sound production device, including:

a rigid cavity wall enclosed to form a cavity of the sound absorbing material encapsulation structure, the cavity is configured to accommodate a sound absorbing material, the rigid cavity wall is provided with air permeability holes arranged in an array, and the air permeability holes are configured to form a channel for air to flow in and out of the sound absorbing material encapsulation structure, and diameters of the air permeability holes are smaller than a diameter of the sound absorbing material;

a bottom plate sealed and connected to one end surface of the rigid cavity wall, the bottom plate is configured to support the sound absorbing material;

a covering plate provided to cover another end surface of the rigid cavity wall, the covering plate is sealed and connected to the rigid cavity wall.

Optionally, the bottom plate and the rigid cavity wall are made of the same material, and the bottom plate is provided with the air permeability holes arranged in an array.

Optionally, the air permeability holes are distributed on an entire outer side surface of the rigid cavity wall; a distance between two adjacent air permeability holes is greater than the diameters of the air permeability holes.

Optionally, the rigid cavity wall is made of silicone material.

Optionally, the rigid cavity wall is formed by injection-molding or hot pressing.

Optionally, the covering plate is made of sound absorbing cotton, and the sound absorbing cotton is sealed and connected to the other end surface of the rigid cavity wall by adhesive.

Optionally, at least one partition plate is provided in the sound absorbing material encapsulation structure, and the partition plate is perpendicular to the bottom plate; the partition plate is configured to divide the cavity into two or more accommodating cavities.

Optionally, the partition plate is provided with the air permeability holes thereon.

Optionally, a thickness of the partition plate is less than or equal to a thickness of the rigid cavity wall.

A sound production device, including:

a vibration system configured to produce sound by vibration;

a magnetic circuit system configured to provide a magnetic field for the vibration system;

a housing assembly in which the vibration system and the magnetic circuit system are disposed, the housing assembly is configured to form a rear acoustic cavity;

the above-described sound absorbing material encapsulation structure, which is disposed in the rear acoustic cavity.

The beneficial effect of the technical solution of the present disclosure is that, the sound absorbing material encapsulation structure in which the sound absorbing material is filled is formed by a rigid cavity wall, so that the sound absorbing material encapsulation structure can be prevented from being deformed, thereby preventing the sound absorbing material in the sound absorbing material encapsulation structure from collapsing due to pressure.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of this specification, illustrate embodiments of the present disclosure, and together with the description serve to explain the principles of the invention.

Figure 1:
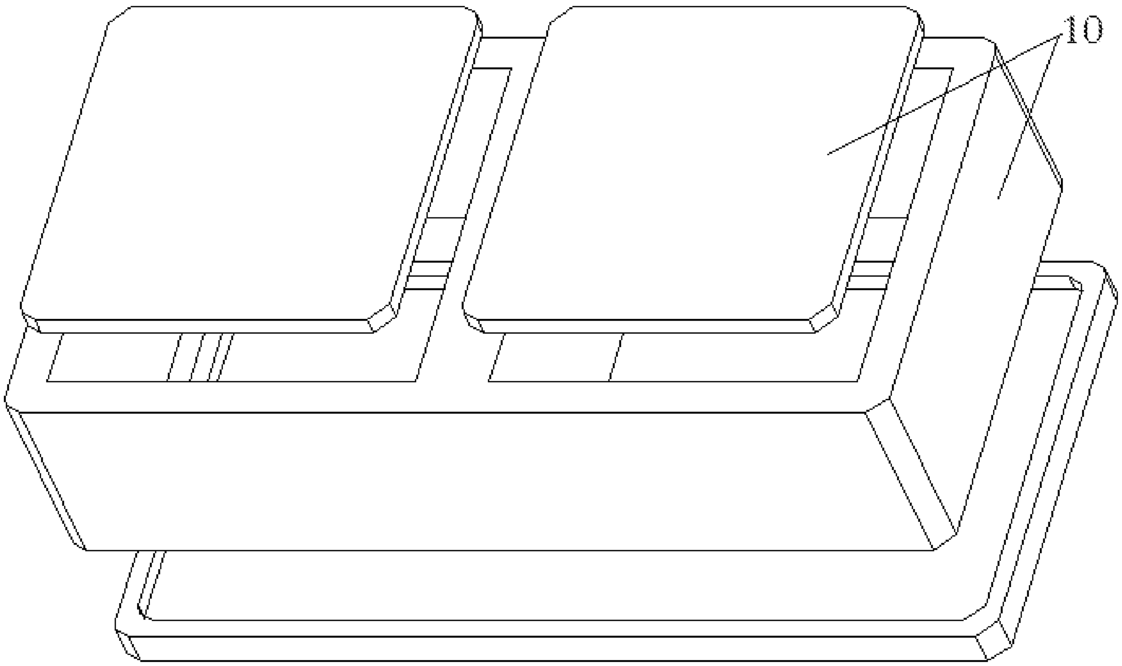
FIG. 1 is a schematic diagram of a sound absorbing material encapsulation structure in the prior art.

Reference numerals: 10—injection-molded mesh cloth; 20—sound absorbing material encapsulation structure; 201—rigid cavity wall; 202—bottom plate; 203—covering plate; 204—air permeability hole; 205—partition plate.

DETAILED DESCRIPTION OF THE EMBODIMENTS

Various exemplary embodiments of the present disclosure will now be described in detail with reference to the following drawings. It should be noted that the relative arrangement of components and steps, the numerical expressions and numerical values set forth in these embodiments do not limit the scope of the disclosure unless specifically stated otherwise.

The following description of at least one exemplary embodiment is in fact merely illustrative and is in no way intended to limit the present disclosure and the applications or uses thereof.

Techniques, methods, and apparatus known to those of ordinary skill in the relevant art may not be described in detail, but such techniques, methods, and apparatus should be considered a part of the specification according to appropriate circumstance.

In all examples illustrated and described herein, any specific values should be construed as illustrative only instead of a limitation. Accordingly, other examples of the exemplary embodiment may have different values.

It should be noted that like reference numbers and letters refer to like items in the following drawings, therefore once a certain item is defined in one drawing, it does not require further explained in subsequent drawings.

Harp powder pack is generally disposed in the rear acoustic cavity of the sound production device to increase a virtual acoustic volume of the sound production device. As illustrated in FIG. 1, in the prior art, the Harp powder pack forms a cavity by using a flexible injection-molded mesh cloth through ultrasonic welding, then the sound absorbing powder is filled in the cavity, and then the cavity is sealed. Since the injection-molded mesh cloth is a flexible material, it is easily squeezed by other components of the sound production device after the Harp powder pack is disposed. A sound absorbing material is generally a porous brittle material, and is easily crushed to lose functions thereof, and the crushed powder is easy to contaminate the sound production device. Therefore, it is necessary to improve the existing Harp powder pack to solve the problem that the sound absorbing material is easily crushed.

The present disclosure proposes a sound absorbing material encapsulation structure for a sound production device, including: a rigid cavity wall enclosed to form a cavity of the sound absorbing material encapsulation structure, and the cavity is configured to accommodate a sound absorbing material, the rigid cavity wall is provided with air permeability holes arranged in an array, and the air permeability holes are configured to form a channel for air to enter or exit the sound absorbing material encapsulation structure, diameters of the air permeability holes are smaller than a diameter of the sound absorbing material; a bottom plate sealed and connected to one end surface of the rigid cavity wall, and is configured to support the sound absorbing material; a covering plate provided to cover another end surface of the rigid cavity wall, and sealed and connected to the rigid cavity wall.

Figure 2:
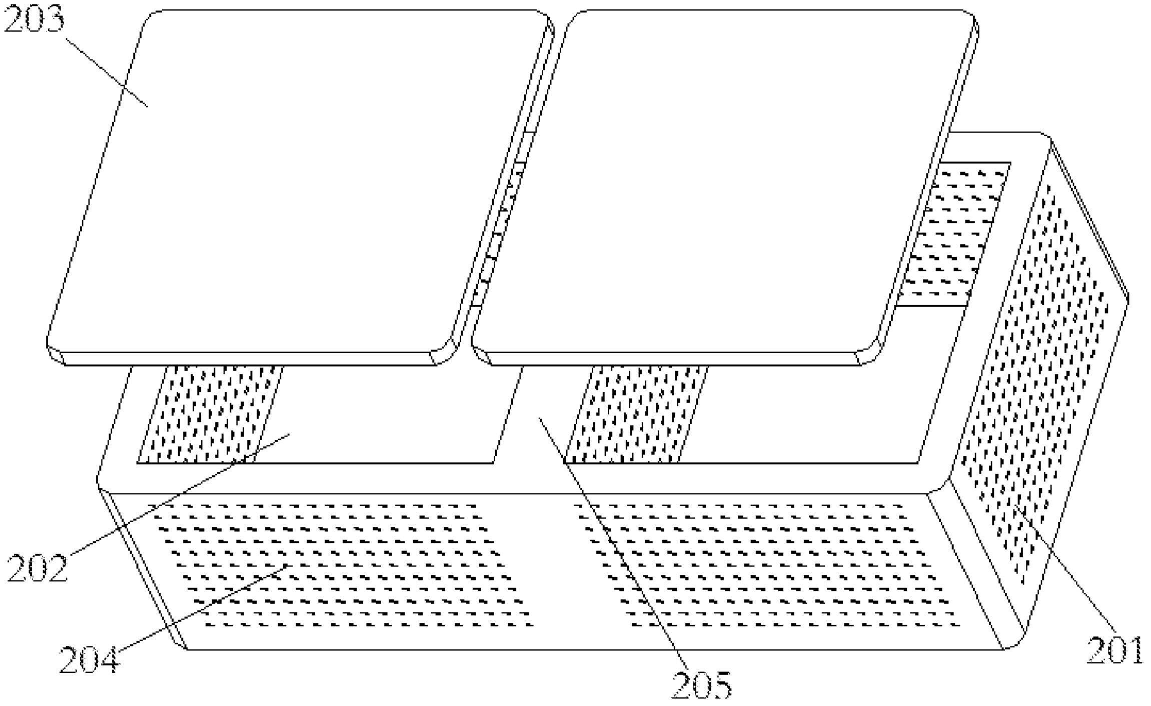
FIG. 2 is a structural diagram of a sound absorbing material encapsulation structure for a sound production device according to an embodiment of the present disclosure.
Figure 3:
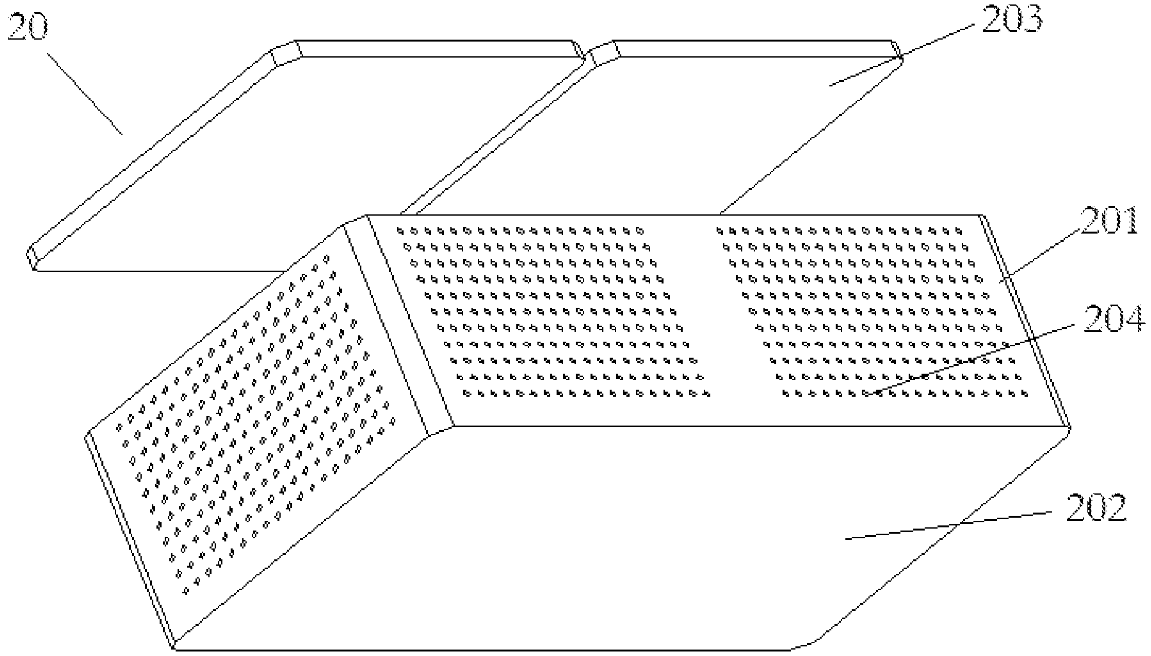
FIG. 3 is a structural diagram of a sound absorbing material encapsulation structure for a sound production device according to an embodiment of the present disclosure.

As an embodiment of the present disclosure, referring to FIGS. 2 and 3, the sound absorbing material encapsulation structure 20 for a sound production device includes a rigid cavity wall 201. The rigid cavity wall is enclosed to form a cavity for accommodating the sound absorbing material. When the sound absorbing material encapsulation structure is used, the sound absorbing material is filled in the cavity. Both ends of the rigid cavity wall are opened for filling the sound absorbing material into the sound absorbing material encapsulation structure. Optionally, a bottom plate 202 is connected to one end surface of the rigid cavity wall, the bottom plate and the rigid cavity wall together form a box structure with an opening at one end. Optionally, air permeability holes 204 are formed on the rigid cavity wall in an array, and the air permeability holes penetrate the rigid cavity wall and communicate with an inner cavity and the outside of the sound absorbing material encapsulation structure. The air permeability holes are used as a channel for gas to flow in and out of the sound absorbing material encapsulation structure. When the sound production device vibrates and produces sound, the gas flows in and out of the air permeability holes to balance the gas pressure between the rear acoustic cavity and the outside. Optionally, the diameter of the air permeability hole is disposed to be smaller than the material diameter of the sound absorbing material, so that the sound absorbing material can be prevented from leaking out of the sound absorbing material encapsulation structure through the air permeability holes, so as to ensure the effect of sound absorbing material on the expansion of the virtual acoustic volume of the rear acoustic cavity, and in the meanwhile preventing the sound absorbing material from contaminating the rear acoustic cavity. In addition, the diameter of the air permeability hole being smaller than the material diameter of the sound absorbing material can also prevent the sound absorbing material from blocking the air permeability holes and ensure that the air can smoothly flow in and out of the sound absorbing material encapsulation structure. Optionally, the bottom plate, which constitutes the sound absorbing material encapsulation structure together with the rigid cavity wall, can be used to support the sound absorbing material. As an embodiment, the sound absorbing material encapsulation structure of the present disclosure further includes a covering plate 203, the covering plate is provided on the other end surface of the rigid cavity wall, and is sealed and connected to the rigid cavity wall. After the sound absorbing material is filled in the sound absorbing material encapsulation structure, the covering plate and the bottom plate seal and cover two openings on the end surfaces of the rigid cavity wall, so that the sound absorbing material can be prevented from leaking out of the sound absorbing material encapsulation structure.

The sound absorbing material encapsulation structure provided by the present disclosure includes a rigid cavity wall, which has a certain rigidity and is not easily deformed, and can prevent the brittle and porous sound absorbing material filled therein from being squeezed, thereby ensuring the acoustic performance of the sound production device. Evenly distributed air permeability holes are formed on the rigid cavity wall in an array, so that the gas can smoothly flow in and out of the sound absorbing material encapsulation structure. By setting the diameter of the air permeability holes to be smaller than the material diameter of the sound absorbing material, the sound absorbing material can be prevented from leaking out of the sound absorbing material encapsulation structure, and the sound absorbing material can be prevented from contaminating the rear acoustic cavity, and in the meanwhile the sound absorbing material can be prevented from blocking the air permeability holes so as to ensure the airflow to smoothly flow in and out of the air permeability holes. The bottom plate and the covering plate are disposed on the openings at both ends of the rigid cavity wall in a sealing manner, so that the sound absorbing material can be sealed within the sound absorbing material encapsulation structure.

Optionally, the bottom plate and the rigid cavity wall are made of the same material, and the bottom plate is provided with the air permeability holes arranged in an array.

As an embodiment of the present disclosure, the bottom plate 202 can be made of the same material as the rigid cavity wall 201, and the bottom plate is also provided with the air permeability holes arranged in an array. Likewise, the diameter of the air permeability holes is required to be smaller than the material diameter of the sound absorbing material. Increasing the number of the air permeability holes can shorten the time required for the gas pressure inside and outside the sound absorbing material encapsulation structure 20 to reach equilibrium, can improve the acoustic sensitivity of the sound production device, and can be beneficial to optimize the acoustic performance of the sound production device. The bottom plate is made of the same rigid material as the rigid cavity wall, which can improve the rigidity of the sound absorbing material encapsulation structure so that the sound absorbing material encapsulation structure is not easily compressed and deformed, and can prevent the brittle and porous sound absorbing material filled therein from being squeezed, thereby ensuring the acoustic performance of the sound production device.

Optionally, the air permeability holes are distributed on the entire outer side surface of the rigid cavity wall; the distance between two adjacent air permeability holes is greater than the diameters of the air permeability holes. As an embodiment of the present disclosure, the air permeability holes 204 are distributed on the entire outer surface of the rigid cavity wall 201, in this way, with the surface area of the rigid cavity wall unchanged, more air permeability holes are provided, so that the airflow can quickly flow in and out of the sound absorbing material encapsulation structure, which improves the acoustic sensitivity of the sound production device, thereby optimizing the acoustic performance of the sound production device. Optionally, the distance between two adjacent air permeability holes is greater than the diameters of the air permeability holes. The distance between two adjacent air permeability holes refers to a distance between two closest points on the edges of the two air permeability holes. In this structure, the rigid cavity wall can ensure its own strength on the basis of having good gas absorption and discharge capability, so as to prolong the service life of the sound absorbing material encapsulation structure, thereby prolonging the service life of the sound production device.

Optionally, the rigid cavity wall 201 is made of silicone material. Using silicone material to form the rigid cavity wall can provide the rigid cavity wall with a certain rigidity to withstand a pressure within a certain range, and can effectively prevent the sound absorbing material in the sound absorbing material encapsulation structure from being squeezed due to the deformation of the sound absorbing material encapsulation structure 20 to cause the material particles to collapse under pressure and thereby affecting the acoustic performance of the sound production device. In addition, the silicone material is easy to obtain, the rigid cavity wall is easy to manufacture, and the production efficiency is high, and various specifications of sound absorbing material encapsulation structures can be manufactured according to the requirements, therefore the manufacturing cost of the sound absorbing material encapsulation structure can be greatly reduced.

Optionally, the rigid cavity wall is formed by means of injection-molding or hot pressing.

As an embodiment of the present disclosure, when the rigid cavity wall 201 is made of silicone material, the rigid cavity wall can be manufactured by means of injection-molding or hot pressing. The two forming processes are simple and easy to implement. The rigid cavity wall obtained by mold-forming has high dimensional accuracy, so that the later repair process can be omitted. Meanwhile, the air permeability holes 204 can be integrally formed with the rigid cavity wall, which simplifies the manufacturing process of the rigid cavity wall. On the other hand, the rigid cavity wall obtained by means of injection-molding or hot pressing has higher strength, which reduces the possibility of the rigid cavity wall being deformed during use, and prevents the sound absorbing material from being crushed. The rigid cavity wall of the present disclosure may also be formed by other molding methods, which is not limited in the present disclosure.

As an example, when the bottom plate 202 is made of the same material as the rigid cavity wall 201, the bottom plate can be integrally formed with the rigid cavity wall. By integrally forming the bottom plate with the rigid cavity wall, the structural integrity of the sound absorbing material encapsulation structure can be improved, and the structural complexity can be reduced, and in the meanwhile, the manufacturing process of the sound absorbing material encapsulation structure can be simplified, which is conducive to reducing manufacturing costs. Optionally, when the bottom plate is made of the same material as the rigid cavity wall, the bottom plate and the rigid cavity wall may also be connected in a sealing manner by means of bonding. The present disclosure does not limit the method of connecting the bottom plate and the rigid cavity wall.

Optionally, the covering plate is made of sound absorbing cotton, and the sound absorbing cotton is sealed and connected to the other end surface of the rigid cavity wall by means of adhesive.

As an embodiment of the present disclosure, the covering plate 203 covering on the other end surface of the rigid cavity wall 201 can be configured as sound absorbing cotton. Specifically, the sound absorbing cotton may be a sheet-like structure whose size is slightly larger than that of the end surface opening of the rigid cavity wall. As a connection method, the sound absorbing cotton may be sealed and connected to the end surface opening of the rigid cavity wall by adhesive. Optionally, the adhesive used may be a double-sided adhesive tape in a semi-cured state or an uncured adhesive liquid. The double-sided adhesive tape or adhesive liquid is applied onto an area of the sound absorbing cotton connected with the rigid cavity wall, and then the sound absorbing cotton is sealed and bonded to the rigid cavity wall, so that the sound absorbing cotton cover the end surface opening. The present disclosure does not limit the type of adhesive. Of course, the sound absorbing cotton may also be sealed and connected to the rigid cavity wall by other methods, and the methods of connecting the sound absorbing cotton are not limited herein. Configuring the covering plate by using sound absorbing cotton can not only use the sound absorbing cotton to absorb the fluid noise in the rear acoustic cavity of the sound production device and reduce the adverse effect of fluid noise on the acoustic performance, but also the sound absorbing cotton can be used as a covering plate to be sealed on the end surface opening, which can prevent the sound absorbing material in the sound absorbing material encapsulation structure from leaking. Meanwhile, the bonding process of the sound absorbing cotton is simple and the material cost is low, which can significantly reduce the production cost of the sound absorbing material encapsulation structure.

As an embodiment, the bottom plate may also be configured as sound absorbing cotton. The bottom plate is connected to a section of the rigid cavity wall by adhesive. Configuring the bottom plate by using sound absorbing cotton can enhance the effect of absorbing fluid noise in the rear acoustic cavity, and can further reduce the adverse effect of fluid noise on acoustic performance.

Optionally, at least one partition plate is provided in the sound absorbing material encapsulation structure, and the partition plate is perpendicular to the bottom plate; the partition plate is configured to divide the cavity into two or more accommodating cavities.

As an embodiment of the present disclosure, as illustrated in FIG. 2, at least one partition plate 205 is provided in the sound absorbing material encapsulation structure 20. The partition plate is disposed perpendicular to the bottom plate 202, and divides the cavity enclosed by the rigid cavity wall 201 into a plurality of accommodating cavities. Optionally, the partition plate of the present disclosure can be integrally formed with the rigid cavity wall, so that the partition plate can be integrally provided when the rigid cavity wall is formed, which simplifies the manufacturing process of the sound absorbing material encapsulation structure and is beneficial to reducing the manufacturing cost. The partition plate provided by the present disclosure is used as a support structure of the sound absorbing material encapsulation structure and can improve the structural strength of the sound absorbing material encapsulation structure and avoid deformation under pressure, on the other hand, the partition plate divides the cavity into a plurality of accommodating cavities, which can prevent the sound absorbing material from squeezing each other under the action of air flow, and can effectively reduce the probability of pulverizing the sound absorbing material, thereby maintaining the effect of increasing the virtual acoustic space by the sound absorbing material, and prolonging the service life of sound absorbing material.

Optionally, the partition plate 205 is provided with the air permeability holes 204. Providing air permeability holes on the partition plate can reduce the effect of obstructing the airflow due to the partition plate, is beneficial to the airflow to flow between different accommodating cavities, so that the sound absorbing material in each of the accommodating cavities cooperates with each other to complete the gas adsorption and discharge process, and the utilization rate of the sound absorbing material is improved, and thus the acoustic performance of the sound production device is improved.

Optionally, the thickness of the partition plate 205 is less than or equal to the thickness of the rigid cavity wall 201. In the present disclosure, the thickness of the partition plate is less than or equal to the thickness of the rigid cavity wall, thereby the partition plate can function the supporting effect, and on the other hand, it is possible to prevent the space for filling the sound absorbing material from reducing as much as possible so as to ensure the filling amount of the sound absorbing material.

The present disclosure also provides a sound production device, including: a vibration system configured to produce sound through vibration; a magnetic circuit system configured to provide a magnetic field for the vibration system; a housing assembly, in which the vibration system and the magnetic circuit system are disposed, and the housing assembly is configured to form a rear acoustic cavity; and the above-described sound absorbing material encapsulation structure, which is disposed in the rear acoustic cavity.

Specifically, the vibration system of the sound production device may include a voice coil and a diaphragm, and the diaphragm is combined on the voice coil. When the voice coil is supplied with a current, it vibrates under the action of a magnetic field, and the diaphragm vibrates along with the voice coil, thereby driving the gas around the diaphragm to flow and produce sound. The sound production device further includes a magnetic circuit system. Optionally, the magnetic circuit system may include a magnet that provides a magnetic field for the vibration system. Optionally, the voice coil is suspended in a magnetic gap of the magnetic circuit system, and cuts the magnetic induction lines in the magnetic field to generate vibration. The sound production device further includes a housing assembly, the vibration system and the magnetic circuit system are disposed in the housing assembly. A rear acoustic cavity is formed in the housing assembly, and the sound absorbing material encapsulation structure described above is disposed in the rear acoustic cavity to increase the virtual acoustic volume of the rear acoustic cavity. In the sound production device provided by the present disclosure, the sound absorbing material encapsulation structure is disposed in the rear acoustic cavity, which can effectively increase the acoustic volume of the rear acoustic cavity, thereby increasing the vibration frequency range of the sound production device, and effectively optimizing the high frequency acoustic performance of the sound production device. The sound absorbing material encapsulation structure itself has good strength and is not easily deformed, which can prevent the sound absorbing material from being crushed, thereby prolonging the service life of the sound production device.

Although some specific embodiments of the present disclosure have been described in detail by way of examples, those skilled in the art should understand that the above examples are provided for illustration only and not for the purpose of limiting the scope of the present disclosure. Those skilled in the art will appreciate that modifications may be made to the above embodiments without departing from the scope and spirit of the present disclosure. The scope of the present disclosure is defined by the appended claims.

What is claimed is:

1. A sound absorbing material encapsulation structure for a sound production device, comprising:

a rigid cavity wall enclosed to form a cavity of the sound absorbing material encapsulation structure, the cavity is configured to accommodate a sound absorbing material, the rigid cavity wall is provided with air permeability holes arranged in an array, and the air permeability holes are configured to form a channel for air to flow in and out of the sound absorbing material encapsulation structure, and diameters of the air permeability holes are smaller than a diameter of the sound absorbing material;

a bottom plate sealed and connected to one end surface of the rigid cavity wall, the bottom plate is configured to support the sound absorbing material; and a covering plate provided to cover another end surface of the rigid cavity wall, the covering plate is sealed and connected to the rigid cavity wall.

2. The sound absorbing material encapsulation structure for a sound production device according to claim 1, wherein the bottom plate and the rigid cavity wall are made of the same material, and the bottom plate is provided with the air permeability holes arranged in an array.

3. The sound absorbing material encapsulation structure for a sound production device according to claim 1, wherein the air permeability holes are distributed on an entire outer side surface of the rigid cavity wall, and a distance between two adjacent air permeability holes is greater than the diameters of the air permeability holes.

4. The sound absorbing material encapsulation structure for a sound production device according to claim 1, wherein the rigid cavity wall is made of silicone material.

5. The sound absorbing material encapsulation structure for a sound production device according to claim 4, wherein the rigid cavity wall is formed by injection-molding or hot pressing.

6. The sound absorbing material encapsulation structure for a sound production device according to claim 1, wherein the covering plate is made of sound absorbing cotton, and the sound absorbing cotton is sealed and connected to the other end surface of the rigid cavity wall by adhesive.

7. The sound absorbing material encapsulation structure for a sound production device according to claim 1, wherein at least one partition plate is provided in the sound absorbing material encapsulation structure, the partition plate is perpendicular to the bottom plate, and the partition plate is configured to divide the cavity into two or more accommodating cavities.

8. The sound absorbing material encapsulation structure for a sound production device according to claim 7, wherein the partition plate is provided with the air permeability holes thereon.

9. The sound absorbing material encapsulation structure for a sound production device according to claim 7, wherein a thickness of the partition plate is less than or equal to a thickness of the rigid cavity wall.

10. A sound production device, comprising:

a vibration system configured to produce sound by vibration;

a magnetic circuit system configured to provide a magnetic field for the vibration system;

a housing assembly in which the vibration system and the magnetic circuit system are disposed, the housing assembly is configured to form a rear acoustic cavity; and the sound absorbing material encapsulation structure according to claim 1, which is disposed in the rear acoustic cavity.

* * * * *